Feb. 11, 1941. R. G. LE TOURNEAU Re. 21,713

REMOVABLE NECK FOR POWER CONTROL UNITS

Original Filed April 26, 1939 2 Sheets-Sheet 1

INVENTOR
R. G. LeTourneau

BY
ATTORNEY

Feb. 11, 1941. R. G. LE TOURNEAU Re. 21,713

REMOVABLE NECK FOR POWER CONTROL UNITS

Original Filed April 26, 1939 2 Sheets-Sheet 2

INVENTOR
R. G. LeTourneau

BY
ATTORNEY

Reissued Feb. 11, 1941

Re. 21,713

UNITED STATES PATENT OFFICE 21,713

REMOVABLE NECK FOR POWER CONTROL UNITS

Robert G. Le Tourneau, Peoria, Ill., assignor to R. G. Le Tourneau, Inc., a corporation Original No. 2,214,170, dated September 10, 1940, Serial No. 270,146, April 26, 1939. Application for reissue December 13, 1940, Serial No. 370,061

12 Claims. (Cl. 74—11)

This invention relates to a power hoist or cable control unit, of the type now widely mounted on tractors, in the form of an attachment, and which derives its power from the take-off shaft of the tractor. Such a unit includes a housing having a flange adapted to be bolted onto the one provided on the transmission housing of the tractor about the opening giving access to the power take-off shaft. The unit also includes a shaft adapted to be coupled to the take-off shaft.

Tractors of different makes and types have different forms of flanges and bolt-hole drilling, and the operating speed of their take-off shafts vary somewhat, and it has been considered necessary heretofore to make a different model of power unit for each type of tractor. Since the unit comprises many more parts than this housing flange and coupling shaft, and as a whole is quite expensive, a heavy cost burden is placed on the factory or supply house attempting to carry all the different models in stock, as well as an individual user who may have two or more different tractors, but only needs one power unit at any one time.

It is therefore the main object of my invention to avoid the above objectionable features by construction of the power control unit with a removable neck. This not only includes the tractor engaging flange, but the coupling shaft and a train of gears also. These parts are removable with the neck from the main housing of the power unit merely by removing a few bolts and without disturbing the remaining parts of the unit in any way. At the same time, the gear train is readily removable from the neck itself, so that trains having different gear ratios may be mounted therein.

By this means, it is a simple and relatively inexpensive matter to adapt one power unit for use with any type or model tractor, and to arrange the gearing so that any desired and proper drum speed of the unit may be attained regardless of any variations in the operating speed of the take-off shafts of such different models of tractor.

These objects I accomplish by means of such structure and relative arrangement of parts as will fully appear by a perusal of the following specification and claims.

In the drawings similar characters of reference indicate corresponding parts in the several views.

Figure 1:
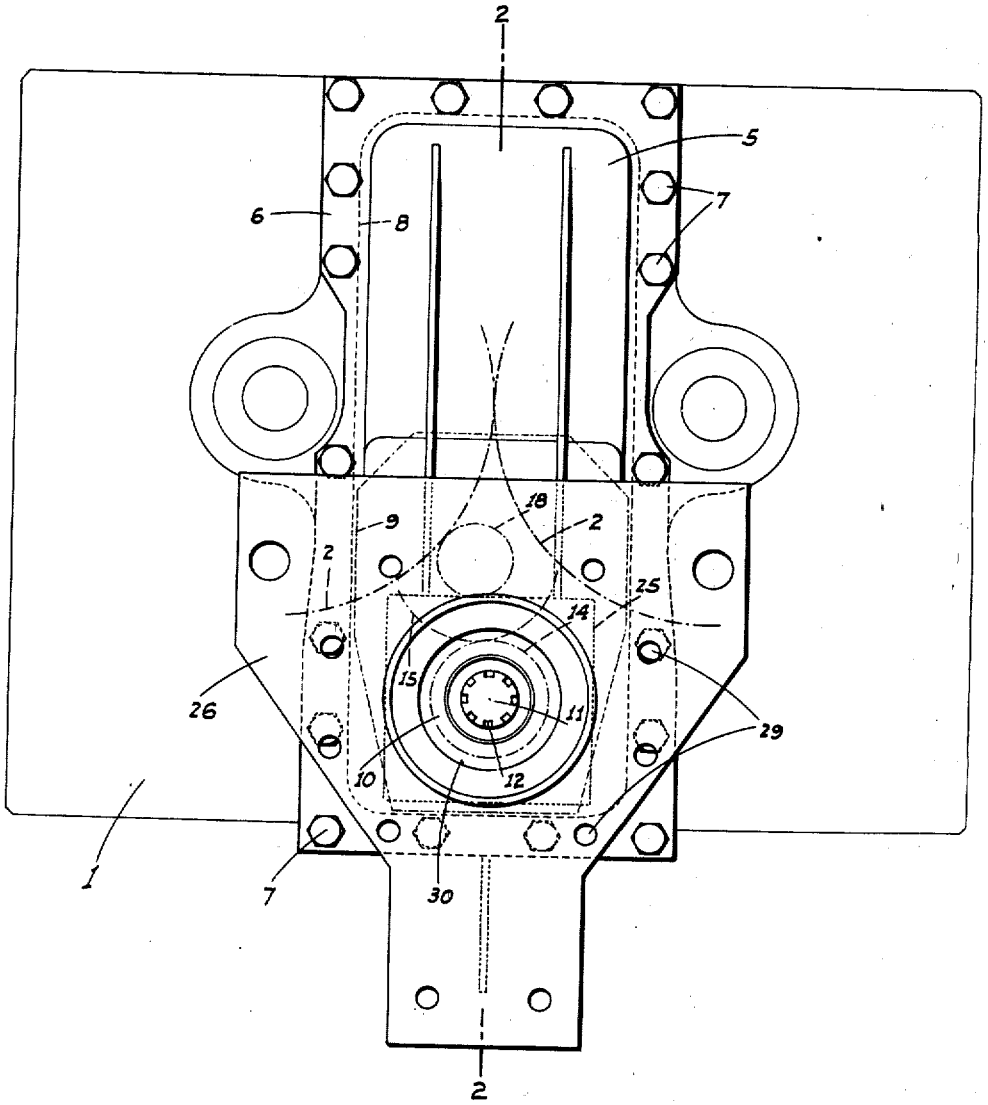
Figure 1 is a front end elevation of the removable neck as mounted on the main housing of a power control unit.
Figure 2:
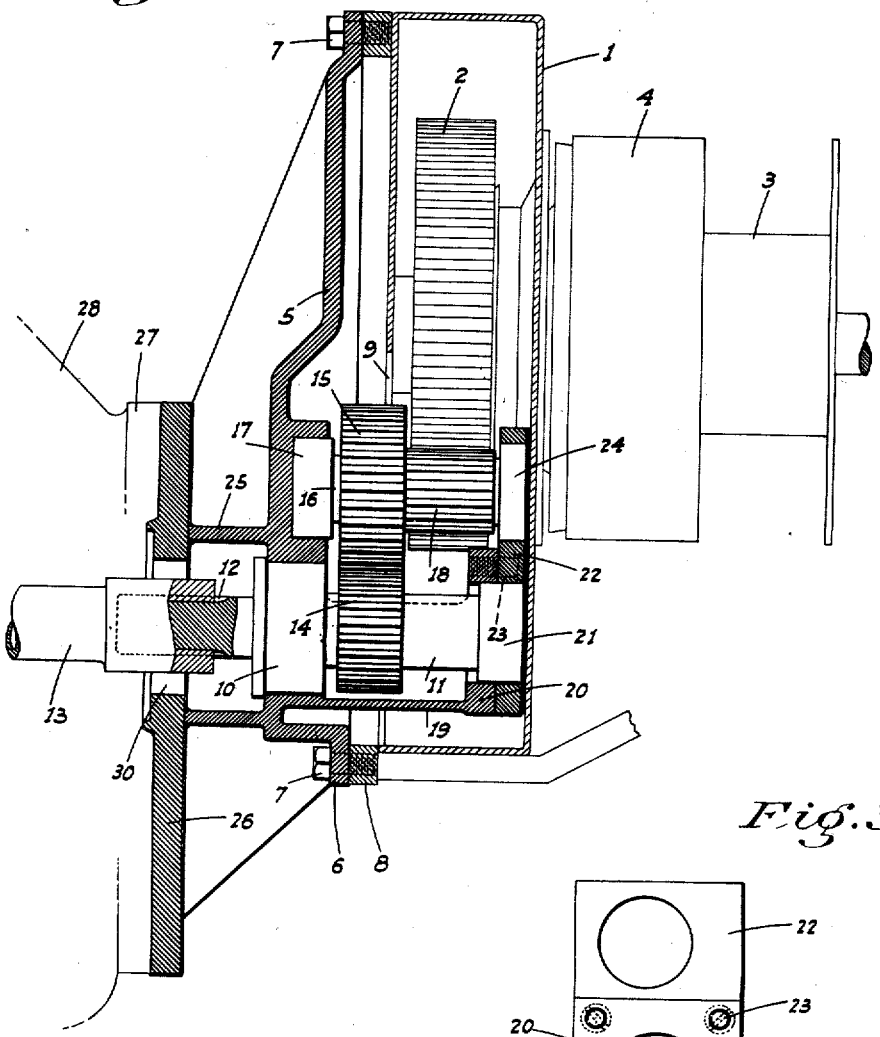
Figure 2 is a vertical section on line 2—2 of Fig. 1.
Figure 3:
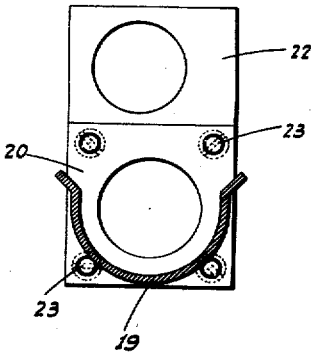
Figure 3 is a cross-section on line 3—3 of Fig. 2, with the gearing and bearings removed.

Referring now more particularly to the characters of reference on the drawings, the power control unit of which the neck forms a part, comprises essentially a main housing 1 containing a driving gear 2, which operates the cable drum 3, a control clutch and brake unit 4 being interposed between the drum and gear. The operating mechanism of these features of the unit forms no part of this invention, and may be the same as that shown in my Patent No. 1,912,645 dated June 6, 1933.

The removable neck which is the subject of this invention, comprises a vertical plate 5 disposed in front of the housing centrally of the width and extending from top to bottom thereof. This plate is provided with a rim flange 6 drilled for a plurality of cap screws 7 and adapted to abut against an endless bead 8 of similar configuration secured on the front of the housing and tapped for the cap screws at points to register with the holes in flange 6. The plate 5, which in the main is spaced in front of the housing an appreciable distance is thus mounted in oil tight relation with the front wall of the housing 1, which has an opening 9 extending upwardly some distance from the bottom between the vertical runs of bead 8.

Removably secured in plate 5 near the bottom is a bearing 10 for a stub shaft 11. This shaft extends ahead of the bearing some distance and is splined as at 12 for detachable driving engagement with the coupling extension 13 by which connection is made with the power take-off shaft of the tractor as usual.

Rearwardly of bearing 10, the shaft carries a pinion 14 meshing with a gear 15 above, the bearing 10 being of greater diameter than the pinion.

This gear is mounted on a shaft 16 supported ahead of the gear in a bearing 17 removably mounted in plate 5. A pinion 18 formed in shaft 16 rearwardly of the gear meshes with main gear 2 when the plate is bolted in place, the gear and pinions projecting through opening 9 in the housing 1.

The plate 5 is extended under and rearwardly of pinion 14 and into housing 1 in the form of a rigid trough 19 which at its rear end is practically integral with an upstanding relatively small plate 20 which is bored to support a bearing 21 for the rear end of shaft 11. The trough forms an oil catch, so that pinion 14 will always run in oil.

Another plate 22 is removably secured by cap screws 23 against the back face of plate 20 and projects thereabove. The plate 22 is bored to receive the bearing 21, so that the latter helps to support said plate, and is also bored above plate 20 for the reception of the bearing 24 for the rear end of shaft 16. It will thus be seen that the upper shaft and gearing unit thereon can be removed by first removing plate 22 and then shifting shaft 16 rearwardly until it clears bearing 17, or if the bearing is fixed on the shaft, until the bearing clears its seat in plate 6. Likewise, shaft 11 and the pinion thereon can be withdrawn upon pulling bearing 10 ahead and clear of plate 5, since as stated, the pinion 14 is smaller than said bearing and can pass through the bore provided therefor in the seat. These operations can of course only be carried out when the neck is detached and the gearing and shaft units are in the open. This arrangement enables pinion and gear units 14 and 15 of different sizes, within certain limits, to be employed, while maintaining the pinion 18 always the one size however, so that the speed ratio between shaft 11 and gear 2 may be altered to maintain a predetermined drum operating speed irrespective of the operating speed of the take-off shaft.

Rigid or integral with plate 6 and projecting ahead of the same in surrounding relation to shaft 11 and bearing 10 is a sleeve 25 which terminates in a flange 26 of the size and configuration of the flange 27 of the transmission housing 28 of the tractor, and which as stated in the preamble, is provided on the tractor about the take-off shaft opening. This flange 26 is drilled for bolts, or studs, as at 29 to match the tapped holes in the tractor flange, so that upon removal of the cover plate of the latter flange, the neck flange can be quickly bolted thereto. The flange 25 has of course a central opening 30 through which the bearing 10 can be inserted and through which shaft 11 projects.

The flange 26, while rigid with sleeve 25, is not integral therewith so that if desired it can be removed and another one of a different size or drilling, to fit a different tractor, put in its place with a minimum of labor and expense.

To remove the neck, it is only necessary to remove cap screws 7, lower the neck sufficiently for the top of plate 22 to clear gear 2, and then pull the neck horizontally until the rearwardly extending parts are clear of the front wall of the housing.

It will be noted that the power control unit shown is of the two-drum type, and as shown in said Patent No. 1,912,645, has a pair of main gears 2 meshing with each other; the driving pinion 18 engaging only one of said gears as shown in the patent and as indicated in Fig. 1 of this application. Since the drums should always turn in the same direction, this has heretofore necessitated two different units for use with take-off shafts rotating in opposite directions.

It will be noted that the shaft 16, and the corresponding bearings therefor in plates 5 and 22, are laterally offset from the vertical median line of the unit, so as to dispose the pinion 18 in position to engage one gear 2 only. With the present removable neck it is only necessary to bore the plates 5 and 22 on one side or the other of said median line, in order to enable the pinion to engage either gear 2, depending on the direction of rotation of the take-off shaft of the particular tractor for which any model neck is intended.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In a power control unit, a casing by which the mechanism of the unit is supported, a stub shaft projecting from the casing for connection with the take-off shaft of a tractor, a flange about said stub shaft adapted to be removably secured against a corresponding flange on the tractor, and means removably mounting the first named flange on the casing whereby different flanges, to suit different tractor flanges, may be used with the one casing.

2. In a power control mechanism, a main gear, a casing supporting and enclosing said gear, said casing including a vertical front wall having an opening therein extending below the gear, a neck removably mounted on said wall over the opening and adapted for mounting against the transmission housing of a tractor, a horizontal shaft mounted in the neck and adapted for connection with the power take-off shaft of such tractor, a pinion supported by the neck within the casing in the horizontal plane of said wall opening and engaging the main gear, and gearing mounted as a unit with and connecting said first named shaft and the pinion.

3. In a power control mechanism, a main gear, a casing supporting and enclosing said gear, said casing including a vertical front wall having an opening therein extending below the gear, a neck removably mounted on said wall over the opening and adapted for mounting against the transmission housing of a tractor, a horizontal shaft mounted in the neck and adapted to connection with the power take-off shaft of such tractor, a pinion supported by the neck within the casing in the horizontal plane of said wall opening and engaging the main gear, and meshing gears fixed axially with said first named shaft and the pinion and projecting through said casing opening; said gears being in front of the pinion and main gear.

4. In a power control mechanism, a main gear, a casing supporting and enclosing said gear, said casing including a vertical front wall having an opening therein extending below the gear, a neck removably mounted on said wall over the opening and adapted for mounting against the transmission housing of a tractor, a horizontal shaft in the neck adapted at its forward end for connection with the power take-off shaft of such tractor, said neck shaft projecting rearwardly through the casing opening to a termination rearwardly of the gear therein, mounting means for said shaft both ahead and rearwardly of the gear in supported connection with the neck, another shaft parallel to said first named shaft, and projecting through said casing opening, means mounting said other shaft both ahead and rearwardly of the gear in supported connection with the neck, a pinion on said other shaft engaging said gear and gear elements mounted as a unit with and connecting said first named and other shafts between the mountings thereof.

5. A structure as in claim 4, in which the mounting means for the first named shaft ahead of the main gear comprises a circular bearing member mounted in the neck and removable by a forward movement; said member being of greater diameter than the adjacent gear element.

6. In a power control mechanism, a main gear, a casing supporting and enclosing said gear, said casing including a vertical front wall having an opening therein extending below the gear, a neck removably mounted on said wall over the opening and adapted for mounting against the transmission housing of a tractor, a horizontal shaft in the neck adapted at its forward end for connection with the power take-off shaft of such tractor, said neck shaft projecting rearwardly through the casing opening to a termination rearwardly of the gear therein, a bearing member for said shaft mounted in the neck ahead of the main gear, another bearing member for the rear end of said shaft, a rigid element extending from the neck ahead of the casing opening to and supporting said other bearing member, a pinion mounted in the neck and engaging the main gear, and meshing gear elements fixed axially with said shaft and the pinion.

7. A structure as in claim 6, in which said rigid element includes a horizontal portion of trough-like form in cross-section depending about the shaft and gear element thereon.

8. In a power control mechanism, a main gear, a casing supporting and enclosing said gear, said casing including a vertical front wall having an opening therein extending below the gear, a neck removably mounted on said wall over the opening and adapted for mounting against the transmission housing of a tractor, a horizontal shaft in the neck adapted at its forward end for connection with the power take-off shaft of such tractor, said neck shaft projecting rearwardly through the casing opening to a termination rearwardly of the gear therein, a bearing member for said shaft mounted in the neck ahead of the main gear, another bearing member for the rear end of said shaft, a rigid element extending from the neck ahead of the casing opening to and supporting said other bearing member, another shaft parallel to and above said first named shaft, a bearing mounted in the neck for said other shaft ahead of the main gear, a bearing for said other shaft rearwardly of the main gear, a member rigid with said rigid element at its rear end supporting said last named bearing, a pinion on said other shaft engaging the main gear and gear elements connecting said shafts.

9. A structure as in claim 8, in which said bearing supporting member comprises a plate bored to receive the bearing, there being means removably mounting said plate on the rigid element.

10. A structure as in claim 8, in which said rigid element includes an upstanding plate bored to receive the adjacent bearing, and said bearing supporting member comprises an upstanding plate bored to receive the bearing and also said adjacent bearing of the first named shaft; there being means removably securing said last named upstanding plate against the back side of the first named plate.

11. In a power control mechanism, a main gear, a casing supporting said gear, a shaft adapted for connection with the power take-off shaft of a tractor, a pinion engaging the gear, a gear train connecting said first named shaft and the pinion, and including another shaft on which said pinion and one gear of the train are mounted, and means removably mounting said shafts in the casing, said means comprising a front member secured on the casing and having bearings for said shafts adjacent one end thereof and a rear member rigid with said front member beyond the gears and having bearings for the adjacent ends of the shafts.

12. In a power control mechanism, a main gear, a casing supporting said gear, a shaft adapted for connection with the power take-off shaft of a tractor, a pinion engaging the gear, a gear train connecting said first named shaft and the pinion, and including another shaft on which said pinion and one gear of the train are mounted, and means removably mounting said shafts in the casing, said means comprising a front member secured on the casing and having bearings for said shafts adjacent the front end thereof, bearing elements for the shafts at their rear end, a member rigid with the front member extending at right angles to the shafts in the plane and bored to receive one of said bearing elements, a plate bored to receive the other bearing element and means removably securing said plate against the rigid member.

ROBERT G. LE TOURNEAU.

DISCLAIMER

Re. 21,713.—*Robert G. Le Tourneau*, Peoria, Ill. REMOVABLE NECK FOR POWER CONTROL UNITS. Patent dated February 11, 1941. Disclaimer filed March 9, 1942, by the inventor and the assignee, *R. G. Le Tourneau, Inc.*

Hereby enter this disclaimer to claims 1, 2, and 3 of the specification.

[*Official Gazette April 7, 1942.*]